Aug. 16, 1927.

H. T. HUGHES 1,639,506

TIRE SPREADING DEVICE

Filed Nov. 10, 1926

Inventor
Hugh T. Hughes
By Bates, Macklin, Golrick & Teare
Attorneys

Patented Aug. 16, 1927.

1,639,506

UNITED STATES PATENT OFFICE.

HUGH T. HUGHES, OF CLEVELAND, OHIO, ASSIGNOR TO THE WADSWORTH CORE MACHINE & EQUIPMENT COMPANY, OF AKRON, OHIO, A CORPORATION OF OHIO.

TIRE-SPREADING DEVICE.

Application filed November 10, 1926. Serial No. 147,478.

This invention relates to a tool which is especially adapted for spreading the bead portions of a tire casing to enable easy access to the inner surfaces thereof for repairs or inspection.

The primary object is to provide a simple and convenient tool for this purpose which will spread the bead portions quickly, and which will then effectively hold the casing in spread position.

Further objects and advantages will become apparent from the following description relating to the accompanying drawing which illustrates the preferred form. The essential novel characteristics appear in the claims.

Figure 1:
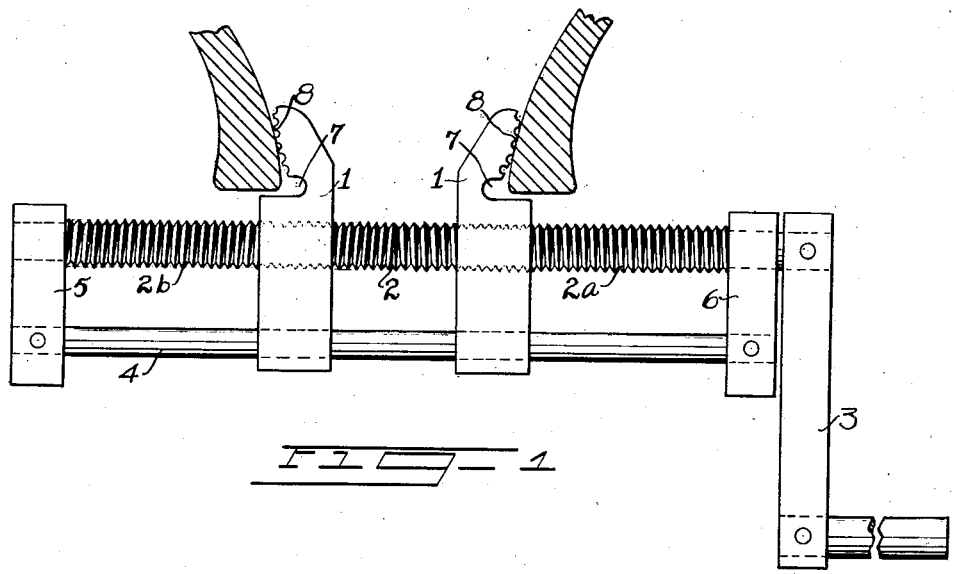
Figure 2:
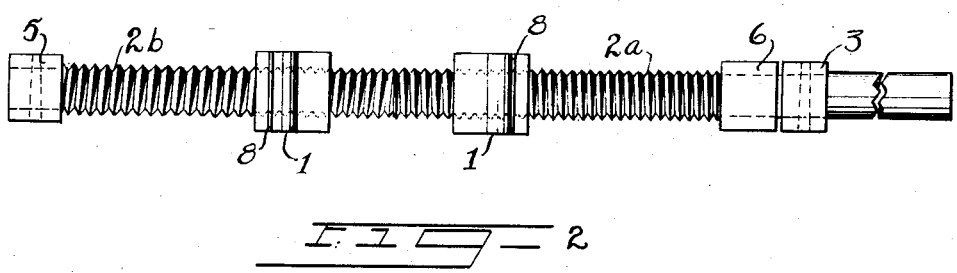

In the drawing Fig. 1 is a side elevation of the tool showing its operating position relative to a tire casing and Fig. 2 is a plan view of the tool.

As shown the tool consists of a pair of jaws 1 arranged to be driven in opposite directions or toward each other by a screw 2. The screw has a right hand threaded portion 2ª on one end and a left hand threaded portion 2ᵇ on the other, each portion engaging a threaded hole in the respective jaw so that, assuming the jaws are held against rotation, turning the screw in a given direction will spread the jaws apart and turning it in the opposite direction will bring them toward each other. Suitable means for turning the screw manually consists, as shown, of a hand crank 3 rigidly carried by one end of the screw.

For holding the jaws against rotation and in parallel relation to each other, I provide a guide bar 4 along which the jaws slide, each jaw being apertured at its lower end to receive the bar, the bar and screw being maintained in fixed parallel relation by means of bearing blocks 5 and 6 rigid with the bar and which serve as journals for the screw. When the tire casing has been spread considerably there will be some tendency for the beads to slip off the jaws, and to prevent this I show the bead engaging face of each jaw recessed as at 7 and provided with a series of teeth formed by notching the outwardly facing surface of each jaw as at 8. Such teeth will frictionally oppose the tendency for the beads to slip even when the beads are quite widely separated from their normal position. Also the teeth prevent any tendency of the whole device from rotating when once the teeth are firmly in contact with the casing.

I claim:

1. A tire spreading tool comprising in combination, a shaft having a right hand threaded portion and a left hand threaded portion, a jaw associated with each threaded portion, said jaws being adapted to engage the inside walls of a tire, and means adjacent one end of the shaft for rotating it and for effecting relative motion of said jaws along said shaft.

2. A tire spreading tool comprising in combination, a threaded shaft having right and left hand threaded portions, a jaw associated with each threaded portion, and a crank for rotating the shaft.

3. In combination, a shaft having a right hand threaded portion and a left hand threaded portion, a jaw associated with each threaded portion, a guide bar extending parallel to the axis of the shaft and being slidably engaged by each of said jaws when the shaft is rotated, but allowing movement of the jaws in a direction axially of the shaft, and means for rotating said shaft.

4. A tire spreading tool comprising in combination, spaced bearing blocks, a threaded shaft journaled in said blocks and extending therebetween, a guide member also extending between said blocks and parallel to the axis of the shaft, a jaw in threaded engagement with each threaded portion of said shaft, each jaw having a portion thereof slidably engaging said member, and a crank operatively associated with said shaft and mounted for turning movement outside one of said blocks.

5. A tire spreading tool comprising in combination a threaded shaft having right and left hand threaded portions, a jaw on each of said portions adapted to engage the tire bead, means for rotating the shaft, and means for maintaining the jaws in parallel relation to each other irrespective of their relative position along the shaft.

6. A tire spreading tool comprising in combination a screw having right and left hand threaded portions, a pair of jaws each adapted to engage an inner edge of a tire casing, each jaw threadingly engaging a respective portion of the screw and a crank rigidly secured to one end of the screw for rotating the same.

7. A tire spreading tool comprising in combination a threaded shaft having right and left hand threaded portions, a jaw associated with each threaded portion, means rigid with one extremity of the shaft for rotating it, and means to maintain the jaws in contact with the edge of a tire casing comprising teeth formed on the casing engaging portion of each jaw.

In testimony whereof, I hereunto affix my signature.

HUGH T. HUGHES.